United States Patent [19]

Ungar et al.

[11] Patent Number: 4,517,235

[45] Date of Patent: May 14, 1985

[54] TRANSFER COATING OF ABRASION-RESISTANT LAYERS

[75] Inventors: Israel S. Ungar; Herbert I. Scher, both of Randallstown; Nelson L. O'Neill, Crofton, all of Md.

[73] Assignee: Nevamar Corporation, Odenton, Md.

[21] Appl. No.: 442,070

[22] Filed: Nov. 16, 1982

[51] Int. Cl.$^3$ .......... D06N 7/04; B41C 1/06; B32C 3/00

[52] U.S. Cl. .......... 428/148; 101/34; 156/230; 156/231; 156/239; 428/149; 428/150

[58] Field of Search .......... 156/230, 231, 239; 428/148, 149, 150; 101/34

[56] References Cited

U.S. PATENT DOCUMENTS

| | | | |
|---|---|---|---|
| 2,556,078 | 6/1951 | Francis | 154/95 |
| 2,654,687 | 10/1953 | Fridolph | 154/98 |
| 2,941,916 | 6/1960 | Akkeron | 156/239 X |
| 3,252,847 | 5/1966 | Morgan et al. | 156/233 |
| 3,351,510 | 11/1967 | Harris | 156/232 |
| 3,467,538 | 9/1969 | Best | 117/8 |
| 3,551,177 | 12/1970 | Hechtman et al. | 264/220 X |
| 3,661,672 | 5/1972 | McQuade, Jr. | 156/220 |
| 3,666,516 | 5/1972 | Dunning | 156/232 |
| 3,770,479 | 11/1973 | Dunning | 156/232 X |
| 3,814,647 | 6/1974 | Scher et al. | 156/219 |
| 3,834,925 | 9/1974 | Matsumura et al. | 117/3.4 |
| 3,953,635 | 4/1976 | Dunning | 428/151 |
| 4,007,067 | 2/1977 | Dunning | 156/61 |
| 4,084,032 | 4/1978 | Pasersky | 428/172 |
| 4,101,698 | 7/1978 | Dunning et al. | 156/230 X |
| 4,305,987 | 12/1981 | Scher et al. | 428/148 |
| 4,392,901 | 7/1983 | Pernicano et al. | 156/155 |

OTHER PUBLICATIONS

"Polymers, Resins and Monomers", Rohm and Haas Company, 1981.

"Rhoplex for Trade Sales", (continued).

"Wear Solution Vinyl Resins for Coatings".

*Primary Examiner*—Michael R. Lusignan

*Attorney, Agent, or Firm*—Karl W. Flocks; Sheridan Neimark

[57] ABSTRACT

Highly abrasion-resistant transfer coatings are provided on a wide variety of substrates, thermoplastic or thermosetting, by transfer coating from a mold surface or a flexible web, such as by use of a heat transfer tape, an ultra-thin coating consisting essentially of a non-resinous binder material such as microcrystalline cellulose together with mineral abrasive particles, preferably alumina or a mixture of silica and alumina which have been heated together at a temperature of at least 140° F., the ultra-thin coating also preferably containing a silane and a small quantity of a sticking agent such as a thermoplastic or thermosetting resin.

29 Claims, 9 Drawing Figures

MOLD TRANSFER-ARC

ARC TRANSFERRED FROM DRUM (MOLD) SURFACE DURING CONTINUOUS LAMINATING (HIGH PRESSURE)

LIQUID COATING DRIES ON DRUM, AND IS TRANSFERRED TO DECORATIVE SURFACE OF LAMINATE DURING CURING UNDER PRESSURE

TRANSFER COATING OF ABRASION-RESISTANT LAYERS

FIELD OF INVENTION

The present invention relates to the coating of surfaces and, more particularly, the provision of abrasion-resistant coatings on various types of substrates by means of transfer coating or printing.

BACKGROUND OF THE INVENTION

U.S. Pat. Nos. 4,255,480; 4,263,081; 4,305,987; and 4,327,141 disclose embodiments which demonstrate abrasion-resistance enhancement of high and low pressure decorative laminates by providing an ultra-thin coating composed of mineral particles and microcrystalline cellulose on the surface of conventional decor paper, followed by impregnating the paper with melamine or polyester resin, and then using the decor paper in a normal laminating process but without the overlay paper. The resultant laminate exhibits abrasion-resistance qualities much better than those of conventionally produced high or low pressure decorative laminates containing an overlay layer.

However, the embodiments illustrated in these patents are directed to the manufacture of abrasiobn-resistant high and low pressure laminates containing thermosetting resins, and there is no disclosure of the use of microcrystalline cellulose in combination with mineral particles in other environments, particularly for the protection of thermoplastic substrates. Moreover, the ultra-thin coating is applied to one of the elements, e.g. the decor sheet, which becomes part of the final laminate product.

Transfer coating or printing, on the other hand, is well known. For example, there is a considerable body of prior art which shows coating compositions for use in transfer (hot stamp) applications to provide abrasion resistance to thermoplastic resin surfaces. Such heat transfers can include a layer containing inorganic grit particles to enhance abrasion resistance.

As described in patents such as U.S. Pat. Nos. 3,666,516; 4,007,067; 3,770,479; 3,953,635; and 4,084,032, hot stamp tapes are often produced with the following layers, noting FIG. 1.

A. Carrier Sheet or Web—such as films of polyester, cellophane, cellulose acetate, or paper.
B. Primer Coat (optional)—to hold tick coat (see C.) to carrier sheet or web.
C. Tick Coat (optional)—to impart a texture if desired.
D. Release Coating (optional)—to enable release of subsequent coating from the above.
E. Replicating Coat (optional)—to replicate the surface of the carrier sheet or web and surfaces of heretofore coated ticks.
F. Abrasion Coat—to impart abrasion resistance.
G. Color Coat—may be one coat or several to decorate the coating.
H. Adhesion Coat—to enable the transferable portion of the composite to stick to the substrate.

The hot stamp tape produced as described is then applied to a suitable substrate (adhesion coat against the substrate) under heat and pressure, and the carrier sheet or web with primer, tick and release coats, if applicable, are removed leaving the subsequent coats laminated onto the substrate, as shown in FIG. 1.

These hot stamp tapes of the prior art typically do not offer suitable abrasion resistance to be used in environments of high traffic and abrasion. This deficiency has kept hot stamp tapes out of sizable markets.

SUMMARY OF THE INVENTION

The present invention is based on the discovery that the ultra-thin abrasion-resistant layers of the type disclosed in the aforementioned U.S. Pat. Nos. 4,255,480; 4,263,081; 4,305,987; and 4,327,141 provide enhanced abrasion resistance to a wide variety of both thermoplastic and thermosetting resin surfaces, and that coatings of this type can be transferred from one surface to another. It is an important feature of the present invention that when inorganic grit is compounded with microcrystalline cellulose, much greater enhancement of abrasion resistance is obtained than in the prior transfer compositions containing equal amounts of inorganic grit.

We have discovered that the ultra-thin abrasion-resistant coatings of the aforementioned U.S. Pat. Nos. 4,255,480; 4,263,081; 4,305,987; and 4,327,141 not only enhance abrasion resistance on thermosetting-type resins such as polyester and melamine-formaldehyde as disclosed in such patents, but also on thermoplastic-type resins such as acrylic and vinyl. We have also discovered that the abrasion-resistanct coating need not be applied onto paper, which is subsequently resin impregnated and used in a laminating process, but that such a layer can be transfer coated in a variety of ways. Furthermore, we have found that enhanced abrasion resistance can be obtained on thermosetting and thermoplastic resins by transferring the coating to the plastic surface from a mold surface, or from a separator or release sheet during the molding or laminating process. Enhanced abrasion resistance using such an ultra-thin layer can also be achieved by transferring the layer plus thermosetting and/or thermoplastic resins as a composite from a carrier to a substrate, after which the carrier is subsequently discarded. We have also discovered that abrasion-resistance enhancement can be obtained using this coating in press cycles of very low pressure and duration.

It is, accordingly, an object of the invention to overcome deficiencies in the prior art, such as pointed out and/or suggested above.

It is another object of the invention to provide for the transfer coating of ultra-thin abrasion-resistant layers.

It is another object of the invention to provide improved products of a great variety of materials, having improved abrasion-resistant surfaces.

These and other objects in the nature and advantages of the instant invention will be more apparent from the following detailed description of specific embodiments, taken in conjunction with the drawing wherein:

DETAILED DESCRIPTION OF EMBODIMENTS

The present invention is operable in a great variety of embodiments, and using a great variety of substrates, and the term "substrate" is used in a broad sense to mean any kind of body capable of receiving a transfer layer, whether the substrate be fibrous, thermoplastic, thermoset or thermosettable, wood, metal, particleboard, etc. The following examples are intended to illustrate, but not to limit, the various possibilities.

I—Hot Stamp Tape (Heat Transferable Coatings)

Hot stamp tape is a web of indeterminate length that carries thermally transferable material that is structured to provide an improved appearance, such as a woodgrain pattern, on a suitable substrate after transfer to the substrate, such as particle board or the like, of transferable layers from the heat stamp web. Of course, the web can also be provided in sheet form. Inexpensive furniture is now made in this way. However, the surface of the product, which involves merely a particle board backing with a thin woodgrain printed coating thereon, is not very durable and is easily abraded.

Figure 1:
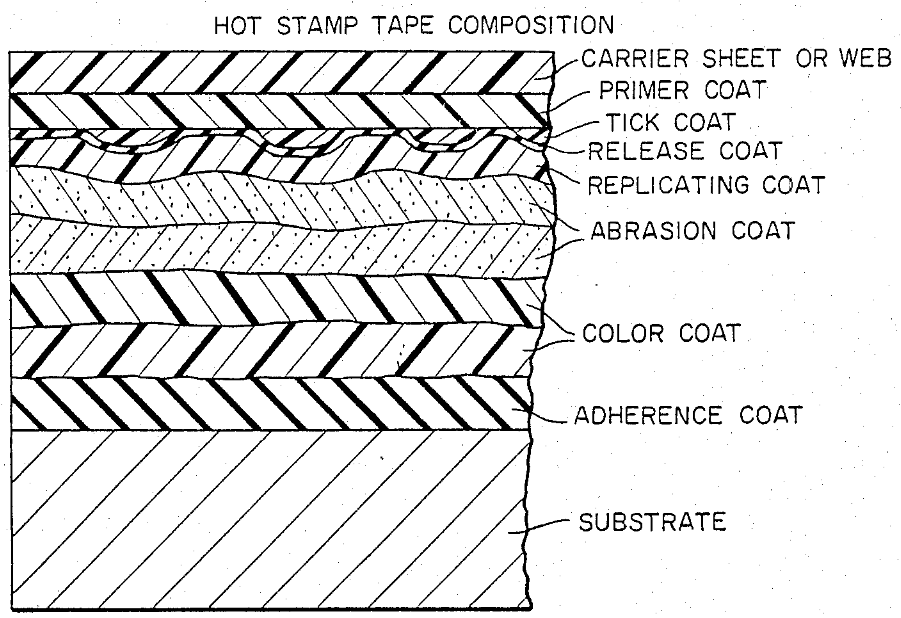
FIG. 1. (PRIOR ART)
FIG. 1 is a typical prior art hot stamp tape, which may be modified to incorporate an ultra-thin abrasion-resistant layer in accordance with the instant invention.

Typically, a carrier web such as Mylar film is coated with a protective coating, then printed with woodgrain reproduction (normally three prints), and is then coated with an adhesive layer. The construction is typically even considerably more complex, such as illustrated in FIG. 1.

The so constructed heat transfer web or hot stamp tape is wound into rolls and sold to furniture companies who heat transfer the composite to particle board or other substrate, the carrier sheet or web being discarded. The particle board is thus decorated with a high quality woodgrain reproduction superior to direct wet printing on the particle board. It eliminates a fairly involved process at the furniture manufacturer level, as well as solving fume problems which are becoming increasingly more difficult as environmental concerns become more predominate, and it also eliminates the need for highly skilled personnel. However, as noted above, the resultant product is not very abrasion-resistant as the top coating provides a NEMA (LD3.1980) abrasion resistance of only about twenty cycles. In addition, most applications require that the furniture manufacturer run the product through an additional coating and drying line.

About seven billion square feet of wood veneer and wood reproductions are used by the furniture industry per year, and if a sufficiently abrasion-resistant product could be provided by transfer printing at a reasonable coat, it is estimated that a large fraction of this market could benefit from such a product.

As is evidenced in Table 1, even the addition of aluminum oxide in relatively large quantity to resins typically used in the abrasion coat F (as mentioned in Dunning, U.S. Pat. No. 4,007,067) does not significantly increase the abrasion resistance of the product. Surprisingly though, with the use of the abrasion-resistant composition of U.S. Pat. No. 4,255,480; 4,263,081; and 4,305,987, the abrasion resistance of the hot stamp tape material is dramatically improved.

Referring to Table 1, a series of trials were run to compare the relative abrasion resistances (as measured by the initial point of wear, NEMA LD3-3.01) of hot stamp tapes of various compositions. Each hot stamp tape composition differed in one way or another from all of the others. Different classes of resins were employed, i.e. thermosetting and thermoplastic types. Two types of thermoplastic resins were used, i.e. vinyl and acrylic. Two types of acrylic were used, i.e. Acrysol WS68 (Acrylic A)* and Rhoplex AC-61 (Acrylic B). One type of thermosetting resin was used, i.e. a butylated melamine-formaldehyde resin.

*Acrysol WS68 is said to be a thermosetting acrylic polymer which, when formulated with monomeric melamine resins, produces industrial baking enamels.

Figure 6:
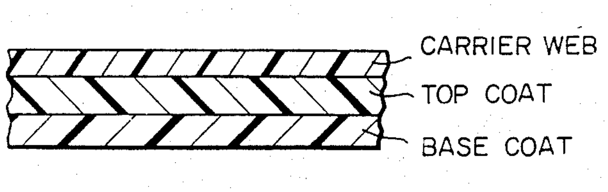
FIG. 6 is a schematic view of a hot stamp tape of simplified construction compared to that of FIG. 1, used for control comparisons in some of the following examples.
Figure 7:
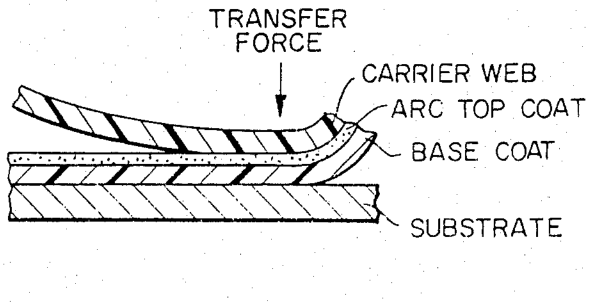
FIG. 7 is a hot stamp tape of similar construction to the control tape of FIG. 6, but made in accordance with the present invention, FIG. 7 also schematically showing the transfer operation in process.

The tapes used were basically of the construction shown in FIGS. 6 and 7. In each case a polyester carrier web was coated first with a top coat composition as set forth in Table 1, after which the top coat was dried at 250° F., the drying being carried out for the periods of from 30 seconds to 90 seconds until the coating was dry to the touch. The base coat was then applied to the top coat and was dried under the same conditions. In Examples 3–10 and 12–14, the base coat also served as an adhesion coat. FIG. 6 shows control Examples 3–10, and FIG. 7 shows Examples 12–14. In Examples 11, 15 and 16 an additional coating was applied over the base coat, which additional coating served as an adhesive coat; in Examples 11 and 16, this adhesive coat was Acrylic A, and in Example 15 it was Acrylic B as shown in Table 1.

All hot stamps were transferred from the polyester film (Melinex 377) onto mirror finish, high pressure decorative laminates used as substrates. So initial wear could be easily determined, the mirror surface of the laminates were decorated with a grid pattern before the transfer process. All thermoplastic transfers were made at pressing conditions of 325° F., 50 psi for 30 seconds and cooled to 90° F. while maintaining pressure. The butylated melamine transfers were made at 375° F., 750 psi for 3 minutes and cooled to 90° F. while maintaining pressure. The aluminum oxide used in all examples was the same.

Control Examples 1–4 illustrate the initial wear values where only resins are used. Control Examples 5–11 show how the addition of aluminum oxide (44–50% by dry coat weight) into the top coat, exposed after transfer, affects abrasion resistance of the hot stamp tapes. The hot stamp tapes of Examples 12–15 were made with approximately the same amount of resin and aluminum oxide as each of the preceding examples, but the abrasion-resistant deposit (ARD) of the invention was the exposed coating after transfer.

The Taber test was used to measure initial wear value. As can be seen from Table 1, the results are dramatic. Control Examples 1, 5 and 6 using Acrylic A gave an initial wear of only 75 cycles, even though control Examples 5 and 6 had a top coat containing, respectively 2.9 and 4.0 pounds per 3000 ft$^2$ of aluminum oxide. When the quantity of aluminum oxide was raised to 5.1 pounds per 3000 $ft^2$ in the top coat, as shown in control Example 7, the initial wear doubled to 150 cycles. These poor values should be compared to Examples 12 and 13 according to the invention wherein initial wear values of more than 500 cycles and 450 cycles were obtained with only 4.6 pounds per 3000 $ft^2$ and 2.5 pounds per 3000 $ft^2$ aluminum oxide, respectively.

Using a different resin system, namely Acrylic B, similar results were achieved. In control Example 2, without alumina, the initial wear was only 50 cycles. In Examples 8 and 9, having a top coating containing 3.5 and 5.6 pounds per 3000 $ft^2$, respectively, of aluminum oxide, the initial wear increased to 100 and 200 cycles, respectively, still relatively poor performance. On the other hand, when using transfer ARD according to the invention as shown in Example 14 and using only 2.5 pounds per 3000 $ft^2$ of aluminum oxide, the initial wear value was 500 cycles.

Using still a different resin, namely vinyl resin, again the results were similar. In control Example 3 using no alumina, the initial wear was only 50 cycles. In control Example 10, having a top coat containing 3.6 pounds per 3000 $ft^2$ of alumina, the initial wear value was 125 cycles. In Example 15 according to the invention, using an ARD top coat containing 4.6 pounds per 3000 $ft^2$ of alumina, the initial wear was 475 cycles; because the vinyl did not act as a good adhesion layer, the vinyl layer in Example 15 (and Example 16 as well as discussed below) was backed by an acrylic adhesion layer.

The results with thermosetting resin were essentially the same. In control Example 4 the initial wear value was only 100 cycles. In control Example 11, having a top coat containing 3.7 pounds per 3000 $ft^2$ of alumina, the initial wear was 225 cycles. But in Example 16, in accordance with the invention, and using approximately 30% less alumina, i.e. 2.5 pounds per 3000 $ft^2$ in an ARD layer, the initial wear was 650 cycles.

Hot stamp tapes are often transferred using heated nip rolls rather than the conventional pressing scheme used above. To simulate a heated nip roll operation, additional ARD coatings were transferred with heat and pressure application for 1 to 3 seconds and no cooling under pressure. Initial wear values comparable to those in Table 1 were achieved using this transfer method.

TABLE 1

| EXAMPLE NUMBER | 1 | 2 | 3 | 4 | 5 | 6 | 7 | 8 |
|---|---|---|---|---|---|---|---|---|
| TOP COAT | ACRYLIC A[1] | ACRYLIC B[2] | VINYL[3] | BUTYLATED[4] MELAMINE | ACRYLIC A + ALUMINA[5] | ACRYLIC A + ALUMINA | ACRYLIC A + ALUMINA | ACRYLIC B + ALUMINA |
| TOP COAT WEIGHT (lb/ream) | 17.2 | 13.4 | 6.6 | 40.1 | 6.6 | 9.0 | 11.5 | 7.9 |
| BASE/ ADHESION COAT | — | — | ACRYLIC A | ACRYLIC A | ACRYLIC A | ACRYLIC A | ACRYLIC A | ACRYLIC B |
| BASE/ ADHESION COAT WEIGHT (lb/ream) | — | — | 3.7 | 8.0 | 7.2 | 7.2 | 7.2 | 6.5 |
| TOTAL COAT WEIGHT (lb/ream) | 17.2 | 13.4 | 10.3 | 48.1 | 13.8 | 16.2 | 18.7 | 14.4 |
| ALUM. OXIDE WT. (IN TOP COAT-lb/ream) | — | — | — | — | 2.9 | 4.0 | 5.1 | 3.5 |
| INITIAL WEAR VALUE (cycles) | 75 | 50 | 50 | 100 | 75 | 75 | 150 | 100 |

CONVENTIONAL TECHNOLOGY

| EXAMPLE NUMBER | 9 | 10 | 11 | 12 | 13 | 14 | 15 | 16 |
|---|---|---|---|---|---|---|---|---|
| TOP COAT | ACRYLIC B + ALUMINA | VINYL + ALUMINA | BUTYLATED MELAMINE + ALUMINA | ARD A[6] | ARD B[7] | ARD B | ARD B | ARD C[8] |
| TOP COAT WEIGHT (lb/ream) | 12.8 | 7.2 | 7.4 | 10.9 | 8.2 | 8.2 | 10.9 | 8.2 |
| BASE/ ADHESION COAT | ACRYLIC B | ACRYLIC B | BUT.MEL/ ACRYLIC A | ACRYLIC A | ACRYLIC A | ACRYLIC B | VINYL/ ACRYLIC B | BUT.MEL/ ACRYLIC A |
| BASE/ ADHESION COAT WEIGHT (lb/ream) | 6.5 | 6.5 | 23.4/7.2 | 9.0 | 10.9 | 11.5 | 7.1/6.5 | 23.4/7.2 |
| TOTAL COAT WEIGHT (lb/ream) | 19.3 | 13.7 | 38.0 | 19.9 | 19.1 | 19.7 | 24.5 | 38.8 |
| ALUM. OXIDE WT. (IN TOP COAT-lb/ream) | 5.6 | 3.6 | 3.7 | 4.6 | 2.5 | 2.5 | 4.6 | 2.5 |
| INITIAL WEAR VALUE (cycles) | 200 | 125 | 225 | 500+ | 450 | 500 | 475 | 650 |

TABLE 1-continued

| CONVENTIONAL TECHNOLOGY | PRESENT INVENTION |
|---|---|

[1]ACRYSOL WS68 - Rohm & Haas - thermosetting acrylic resin
[2]RHOPLEX AC61 - Rohm & Haas - thermosetting acrylic resin
[3]VYNS-3 - Union Carbide
[4]CYMEL 1158 - American Cyanamid - butylated melamine-formaldehyde resin + 7.5% Polymerized Castor Oil - Gas Chem - thermosetting resin
[5]ALUMINUM OXIDE, 30 micron - Micro Abrasives Corp.
[6,7,8]See Table 2

II—Transfer ARD Formulations

Table 2 below shows under the head "ARD A" the basic ARD formula used in Example 12, above. This formulation is essentially the same as those disclosed in U.S. Pat. Nos. 4,255,480; 4,263,081; 4,305,987; and 4,327,141. Details regarding the ARD composition are to be found in these patents, and such details are incorporated by reference. As can be seen from the initial wear value in Table 1, Example 12, above, abrasion resistance is excellent.

However, due to handling techniques which are used in transfer coating, it has been found that handling is improved if a sticking aid or film forming binder is incorporated into the transfer ARD formulation. Any sticking agent that helps the ARD layer adhere to the carrier, such as a thermoplastic, a thermosetting resin, a gum, a colloid, etc., can be used. The quantity of the sticking agent is not critical at the lower end, but at the upper end one must be careful not to use so much sticking agent that the density of the alumina particles in the transfer ARD layer become so low that the abrasion-resistant properties of the ARD layer becomes significantly reduced, i.e. the ARD composition should not be diluted to the point where it is no longer effective. In general, one should use a minimum quantity of sticking agent or film forming binder sufficient to make the process work better; in general, this quantity, measured as solids, should not exceed about 10–35% by weight of the total quantity of solids in the ARD layer, although larger quantities may sometimes be desirable.

Noting Table 2 below, it is seen that the other ARD examples contained as such sticking agent a small quantity of partially advanced melamine-formaldehyde resin or vinyl chloride which enabled better coating adhesion to the polyester film during the coating process. ARD F contains a larger than usual quantity of CMC which in this case serves as a film former. Use of such a sticking agent or film former reduces processing problems of flaking, insufficient wetting, and overcoating all relative to the carrier web.

III—Mold Transfer

Figure 3:
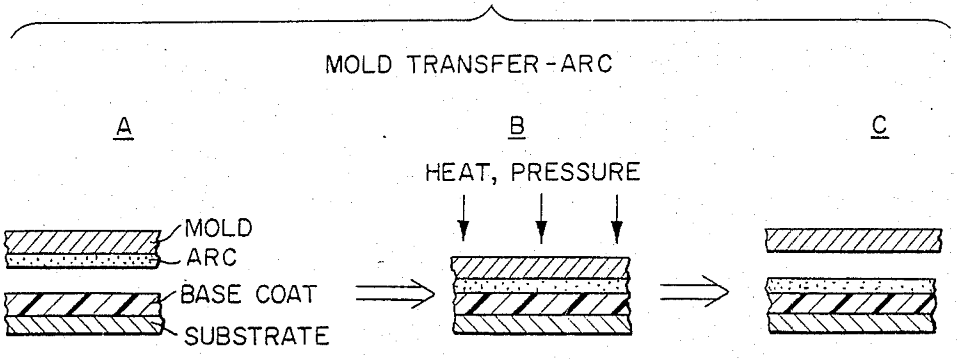
FIG. 3 is a schematic view similar to FIG. 2, showing the transfer of an ultra-thin abrasion-resistant coating according to the invention from a mold surface into the upper surface of a substrate.

Dramatically enhanced abrasion resistance can also be obtained on molded thermoplastic and thermosetting parts and products by transferring the abrasion-resistant coating from a mold to the plastic during the molding process such as shown in FIG. 3. This process has wide utility in forming a wide variety of products, and can be applied easily in any molding or laminating process wherein a mold or die surface is brought into contact under pressure against the plastic (thermoplastic or thermosetting resin) to be shaped or pressed. Thermoset products made in this way include laminates of various kinds, dinnerware, fiberglass impregnated products, automotive and aircraft parts, housings, trays, boxes, helmets, etc. Thermoplastic products include, for example, vinyl floor tile, seat covers, wallpaper, shoes, transparent (e.g. acrylic) products, etc.

Thermosetting Resin

To illustrate that the above-mentioned approach yields unexpected results on melamine-formaldehyde resin, ARD C from Table 2 was coated at a rate of 8.7 lb/3000 ft$^2$ (~2.8 lb/3000 ft$^2$ of grit) onto a mirror finish, chrome plated, stainless steel, press plate and dried at 250° F. This composite was pressed against a substrate of melamine-formaldehyde impregnated decor sheet (dry resin to print paper ratio=0.5 to 1) backed by four phenol-formaldehyde impregnated kraft sheets. The press cycle was typical for high pressure decorative laminates. As illustrated in Table 3, the abrasion resistance initial wear value was dramatically improved over the control (which had no abrasion-resistant coating).

Figure 8:
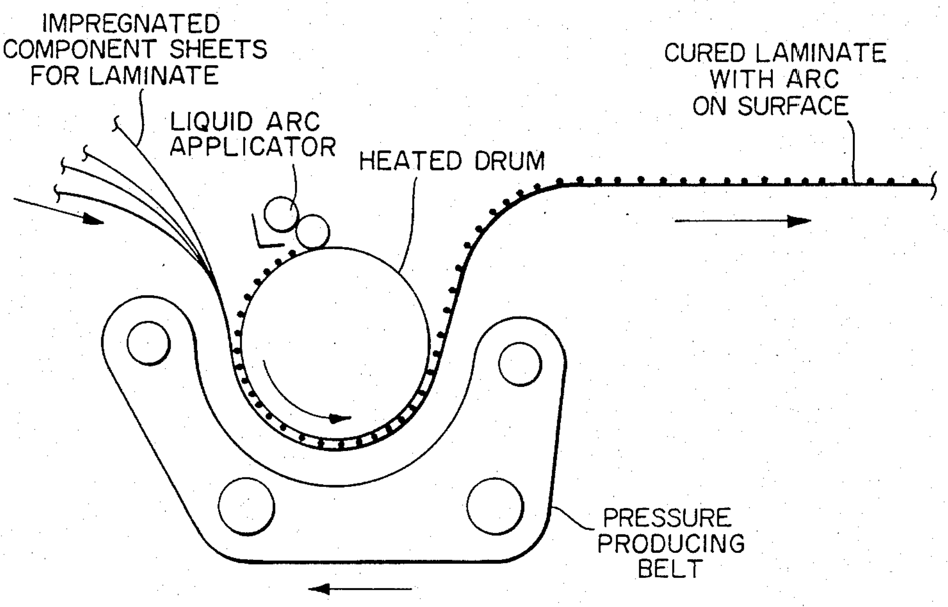
FIG. 8, similar to FIG. 3, shows application of the invention to continuous lamination.

These results enable the production of overlay free enhanced abrasion resistant laminate on continuous laminating equipment such as the Siempelkamp equipment, modified as generaly shown in FIG. 8, and on single opening semi-continuous equipment which is currently under development. Also, low pressure laminate with an ARD surface can be continuously made

TABLE 2

| | ARD A | ARD B | ARD C | ARD D | ARD E | ARD F |
|---|---|---|---|---|---|---|
| $H_2O$ | 617 g | 617 g | 617 g | 617 g | 617 g | 617 g |
| CMC (carboxy methyl cellulose)[1] | 14.5 g | 14.5 g | 14.5 g | 14.5 g | 14.5 g | 45 g |
| Microcrystalline Cellulose[2] | 45 g | 45 g | 45 g | 45 g | 45 g | 45 g |
| Aluminum Oxide[3] | 45 g | 45 g | 45 g | 45 g | 45 g | 45 g |
| Silane[4] | 3 g | 3 g | 3 g | 3 g | 3 g | 3 g |
| Formalin[7] | 1.5 g | 1.5 g | 1.5 g | 1.5 g | 1.5 g | 1.5 g |
| Melamine resin at 50% solids in $H_2O$ | — | 71 g | 71 g | — | 35 g | — |
| Triton X-100[5] | — | — | 1.6 g | — | — | — |
| Vinyl Chloride Emulsion at 50% solids in $H_2O$[6] | — | — | — | 71 g | 35 g | — |

Figure 9:
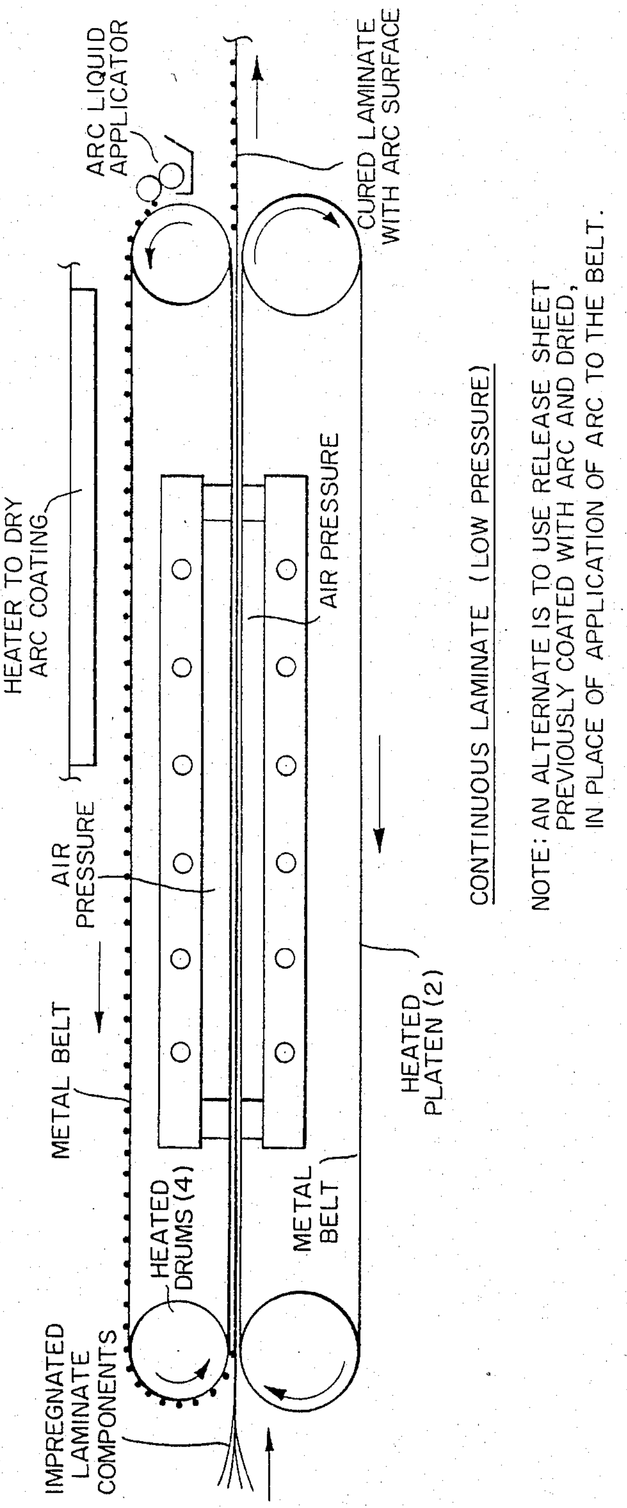
FIG. 9, similar to FIG. 3, shows application of the invention to another form of continuous lamination.

[1]Grade 7L - a product of Hercules Inc.
[2]Type RC591 - a product of FMC Corp.
[3]30 Micron - a product of Micro Abrasives Corp.
[4]A-1100 - a product of Union Carbide Corp.
[5]A surfactant product of Rohm & Haas
[6]Geon 460 × 6 - a product of B. F. Goodrich self-crosslinkable PVC resin latex
[7]37% Formalin - other preservatives may be used.

using the Hymenn equipment modified as shown in FIG. 9.

TABLE 3

| | MOLD TRANSFER-MELAMINE (THERMOSETTING RESIN) (1000 psi, 300° F., 25 min. and cool) | | | |
|---|---|---|---|---|
| | ARD COAT WEIGHT (lb/ream) | PRINT PAPER DRY RESIN TO PAPER RATIO | # IMPREGNATED KRAFT SHEETS (190 lb/ream) | INITIAL WEAR VALUE (CYCLES) |
| Control | — | 0.5-1.0 | 4 | 20 |
| Transfer ARD | 8.7 | 0.5-1.0 | 4 | 575 |

Thermoplastic Resin

Table 4 illustrates how ARD layers result in dramatic abrasion-resistance increases when transferred from mold surfaces onto thermoplastic type resins. Again, only vinyl and two different acrylic resins were used as examples. While Acrylic A is technically a product which sets upon application of heat, it is derived from or incorporates a thermoplastic and has many characteristics of thermoplastic resins and thus was used to simulate thermoplastics; the other two resins may also be curable upon the application of heat, but are believed to remain thermofusible, i.e. thermoplastic.

Figure 2:
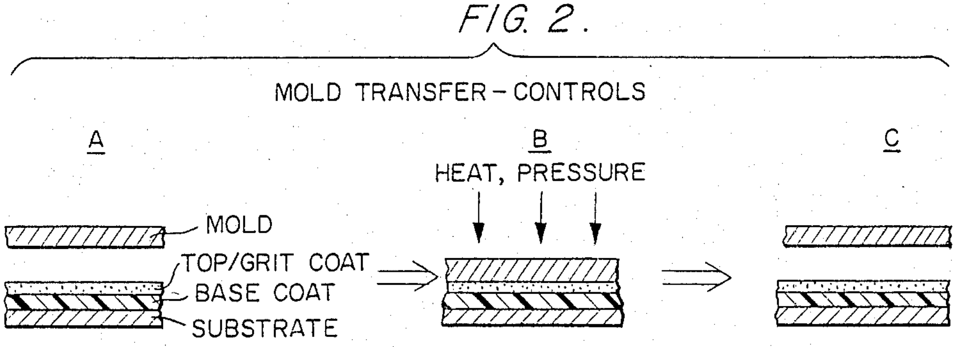
FIG. 2 is a schematic view showing a method for incorporating a grit coating into the surface of a substrate using a mold, according to a control process.

Examples 1, 2, and 3 are controls for the invention and were produced by coating the base coat, then top coat, onto textured finish high pressure decorative laminates, noting FIG. 2. The top coats contained resin/grit ratios of either 1.0 to 0.8 (both acrylic resins) or 1.0 to 1.0 (vinyl). These composites were then pressed against mirror finish chrome plated stainless steel molds under the same conditions that ARD was transferred onto corresponding composites in Examples 4-6.

Examples 4, 5 and 6 were produced by coating the ARD onto the same mold used in Examples 1, 2 and 3, noting FIG. 3. The ARD was then transferred from the mold to the respective thermoplastic resin which was previously coated onto textured, high pressure decorative laminates. An external mold release agent was coated onto the mold before ARD application and pressing in Examples 4 and 5. Note the grit weights for the controls (Examples 1, 2 and 3) are always greater than their ARD transfer equivalents (Examples 4, 5 and 6). Note also that in Examples 3 and 6, a pure vinyl coating was not used, i.e. we used acrylic as the coating against the laminate because the vinyl would not adhere well to the laminate surface.

The resultant initial wear values presented in Table 4 show ARD increased the abrasion resistance of thermoplastic coatings by mold transfer.

TABLE 4

| | MOLD TRANSFER - THERMOPLASTICS | | | | | |
|---|---|---|---|---|---|---|
| | 1 | 2 | 3 | 4 | 5 | 6 |
| TOP COAT | ACRYLIC A/ GRIT[1] | ACRYLIC B/ GRIT[2] | VINYL/ GRIT[3] | ARD C | ARD B | ARD D |
| TOP COAT WT. (lb/ream) | 15 | 10 | 8.5 | 14.8 | 8.7 | 8.7 |
| BASE COAT | ACRYLIC A | ACRYLIC B | VINYL-ACRYLIC A | ACRYLIC A | ACRYLIC B | VINYL-ACRYLIC A |
| BASE COAT WT. (lb/ream) | 34.5 | 34.5 | 9.3-17.4 | 34.5 | 34.5 | 15.7-17.4 |
| GRIT WT. IN TOP COAT (lb/ream) | 6.6 | 4.2 | 6.9 | 4.8 | 2.8 | 2.8 |
| PRESSING CONDITIONS | 325° F. 50 psi 1 min. & cool | 375° F. 750 psi 2.5 min. & cool | 375° F. 300 psi 1 min. & cool | 325° F. 50 psi 1 min. & cool | 375° F. 750 psi 2.5 min. & cool | 375° F. 300 psi 1 min. & cool |
| INITIAL WEAR VALUE (cycles) | 150 | 200 | 150 | 600 | 600 | 425 |
| | | CONTROLS FIG. 2 | | | INVENTION FIG. 3 | |

[1]Acrysol WS68 - Rohm & Haas - Aluminum Oxide, 30 micron, Micro Abrasives Corp.
[2]Rhoplex AC61 - Rohm & Haas - Aluminum Oxide, 30 micron, Micro Abrasives Corp.
[3]Geon 460 × 6 - B. F. Goodrich - Aluminum Oxide, 30 micron, Micro Abrasives Corp.

IV—Surface Separator Transfer

Figure 5:
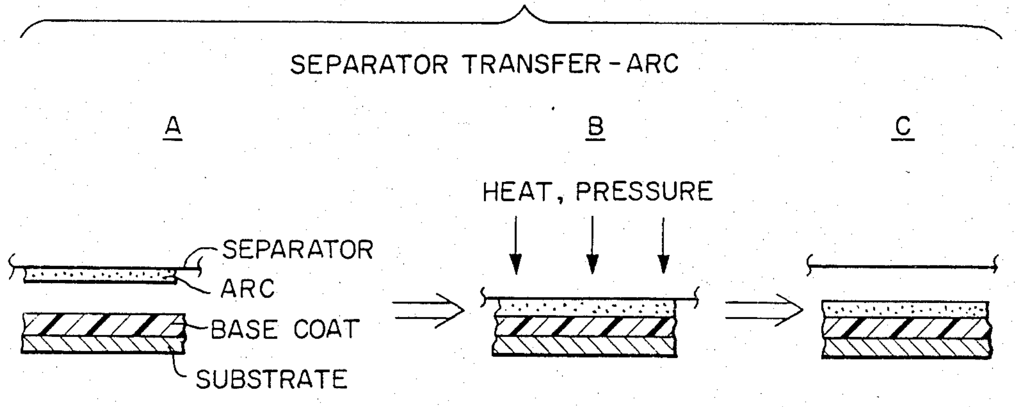
FIG. 5 shows a process similar to FIG. 3 using an abrasion-resistant coating applied to a separator instead of a mold, for transfer to a substrate.

ARD can also be transferred onto thermosetting and thermoplastic resins from a surface separator or release sheet. ARD is coated onto the surface separator or release sheet and then transferred to the resin, as shown in FIG. 5. As in the other transfer procedures described above using ARD in accordance with the instant invention, the surface onto which the ARD layer is transferred must become receptive, e.g. it must temporarily melt or flow, during the transfer operation, for the ARD to adhere thereto, or there must be present a suitable adhesive layer, i.e. a flowable layer over the ARD layer, by which the transfer ARD becomes adhered to the substrate upon transfer of the ARD layer and flowable layer to the substrate and the the forcing of the ARD layer into the flowable layer upon application of heat and pressure.

Thermosetting Resin

To show how abrasion resistance of melamine resin is enhanced by ARD transfer from several types of surface separators during the molding operation, a set of runs were conducted (see Table 5). Different coats weights of ARC C formulation were applied to several types of surface separators and dried to 250° F. to touch. The surface separators used were:
(1) Polypropylene film
(2) Release agent coated glassine paper (3) Release agent coated foil-paper lamination (release coat on foil side).

These surface separators with the dried ARD coatings thereon were then pressed against substrates of melamine resin impregnated decor papers of varying resin contents as shown in column 2 of Table 5, it being understood that the ratio of 0.5–1.0 is the normal industrial resin/paper ratio for making high pressure laminate. and the mold transfer process described earlier is the substitution of a surface separator for the mold. The results of the experiments with surface separators are set forth in Table 6.

Again, while one or more of the products used are technically heatsetting, they are derived from thermoplastics and have many thermoplastic properties and were used for sake of convenience.

TABLE 6

Figure 4:
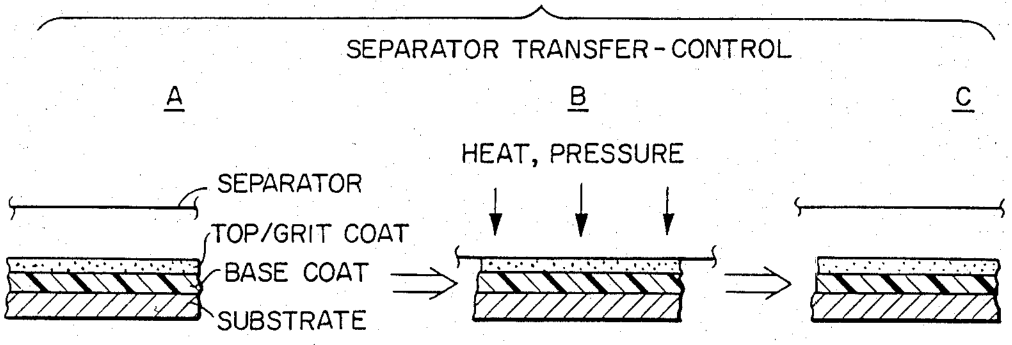
FIG. 4 schematically shows a process similar to FIG. 2, except using a separator instead of a mold.

| SURFACE SEPARATOR TRANSFER - THERMOPLASTICS | 1 | 2 | 3 | 4 | 5 | 6 |
|---|---|---|---|---|---|---|
| TOP COAT | ACRYLIC A/ GRIT[1] | ACRYLIC B/ GRIT[2] | VINYL/ GRIT[3] | ARD C | ARD C | ARD E |
| TOP COAT WT. (lb/ream) | 10 | 14.5 | 13.8 | 8.7 | 9.5 | 8.7 |
| BASE COAT | ACRYLIC A | ACRYLIC B | VINYL-ACRYLIC A | ACRYLIC A | ACRYLIC B | VINYL-ACRYLIC A |
| BASE COAT WT. (lb/ream) | 34.5 | 21.5 | 9.3–17.4 | 34.5 | 21.5 | 15.7–17.4 |
| GRIT WT. IN TOP COAT (lb/ream) | 4.2 | 6.2 | 6.9 | 2.8 | 3.0 | 2.8 |
| PRESSING CONDITIONS | 325° F. 50 psi 1 min. & cool | 375° F. 750 psi 2.5 min. & cool | 375° F. 300 psi 1 min. & cool | 325° F. 50 psi 1 min. & cool | 375° F. 750 psi 2.5 min. & cool | 375° F. 300 psi 1 min. & cool |
| INITIAL WEAR VALUES (cycles) | 175 | 200 | 150 | 525 | 400 | 675 |
| | CONTROLS FIG. 4 | | | INVENTION FIG. 5 | | |

[1]Acrysol WS68 - Rohm & Haas - Aluminum Oxide, 30 micron, Micro Abrasives Corp.
[2]Rhoplex AC61 - Rohm & Haas - Aluminum Oxide, 30 micron, Micro Abrasives Corp.
[3]Geon 460 × 6 - B. F. Goodrich - Aluminum Oxide, 30 micron, Micro Abrasives Corp.

The decor papers were reinforced by 4 sheets of phenolic impregnated kraft paper. Press cycles were varied in duration as shown in Table 5. Upon completion of the press cycles, the surface separators were removed from the composites. From column 4 in Table 5, it is readily apparent that ARD dramatically increased the abrasion resistance of each composite.

TABLE 5

SURFACE SEPARATOR TRANSFER - THERMOSETTING RESIN (1000 psi, 295° F. peak)

| | 1 lbs/ REAM ARD Ct. Wt. | 2 DRY RESIN/ PRINT PAPER WEIGHT RATIO | 3 PRESS CYCLE TIME (minutes) | 4 INITIAL WEAR VALUE (cycles) |
|---|---|---|---|---|
| Control FIG. 4 | — | 0.5–1.0 | 25 | 20 |
| Polypropylene/ ARD C | 8.2 | 0.5–1.0 | 25 | 275 |
| Polypropylene/ ARD C | 10.9 | 0.5–1.0 | 25 | 450 |
| Glassine/ARD C | 8.2 | 0.5–1.0 | 25 | 525 |
| Glassine/ARD C | 10.9 | 0.5–1.0 | 25 | 550 |
| Paper-foil/ARD C | 8.2 | 0.5–1.0 | 60 | 550 |
| Paper-foil/ARD C | 8.2 | 0.7–1.0 | 60 | 650 |

Use of ARD transferred from a surface separator for some applications of use is an improvement over the process shown in U.S. Pat. No. 4,255,480 because the coating does not have to be applied directly to the decor sheet, which is more expensive than the release sheets, resulting in lower cost from handling losses during the coating process.

Thermoplastic Resins

ARD can be transferred from surface separators (e.g. foil/paper laminate) onto thermoplastic resins, e.g. vinyl coated wallpaper. FIG. 5 shows this process using low transfer pressure. The only difference between this It will be obvious to those skilled in the art that various changes may be made without departing from the scope of the invention and the invention is not to be considered limited to what is shown in the drawing and described in the specification.

What is claimed is:

1. A process for providing an abrasion-resistant deposit on the surface of a substrate having a flowable surface, comprising providing a transfer carrier having a dried ultra-thin deposit or coating consisting essentially of a non-resinous binder material and mineral abrasive particles, which ultra-thin deposit has been dried at a temperature of at least 140° F., and transferring said ultra-thin deposit from said carrier into the flowable surface of said substrate under conditions of heat and pressure whereby said deposit becomes combined with the surface of said substrate, and removing said carrier.

2. A process according to claim 1 wherein said carrier is a rigid mold or die surface or a flexible web.

3. A process according to claim 1 wherein said binder material consists essentially of microcrystalline cellulose or a mixture of microcrystalline cellulose with a small quantity of carboxy methyl cellulose.

4. A process according to claim 1 wherein the abrasion-resistant coating also contains a small quantity of a silane.

5. A process according to claim 1 wherein said abrasion-resistant coating also contains an amount sufficient to improve coating properties and up to about 35% by weight based on the total solids of a sticking agent or film-forming binder.

6. A process according to claim 3 wherein the abrasion-resistant coating also contains a small quantity of a silane and up to about 35% based on the total weight of solids of a sticking agent or film-forming binder.

7. A process according to claim 6 wherein said sticking agent or film-forming binder is a thermoplastic or a thermosetting material.

8. A process according to claim 1 wherein said surface of said substrate is a thermosettable material or a thermoplastic.

9. A process for providing an abrasion-resistant deposit on the surface of a substrate, comprising providing a transfer carrier having a dried ultra-thin deposit or coating consisting essentially of a non-resinous binder material and mineral abrasive particles, which ultra-thin deposit has been dried at a temperature of at least 140° F., and a flowable coating over said ultra-thin deposit; and transferring said ultra-thin deposit and flowable coating from said carrier onto the surface of said substrate under conditions of heat and pressure whereby said deposit becomes combined with said flowable coating and adhered to said substrate, and removing said carrier.

10. A transfer separator for carrying out the process of claim 9, wherein said transfer carrier is an impermeable, flexible web, said dried ultra-thin deposit lies over said web, said binder material of said deposit consisting essentially of microcrystalline cellulose or a mixture of microcrystalline cellulose with a small quantity of carboxymethyl cellulose.

11. A transfer separator according to claim 10, wherein the ultra-thin deposit also contains up to 35% by weight, based on the total weight of solids, of a sticking agent or film-forming binder.

12. A process according to claim 9, wherein said carrier is a flexible web.

13. A process according to claim 9, wherein said binder material consists essentially of microcrystalline cellulose or a mixture of microcrystalline cellulose with a small quantity of carboxy methyl cellulose.

14. A process according to claim 9, wherein the abrasion-resistant coating also contains a small quantity of a silane.

15. A process according to claim 9, wherein said abrasion-resistant coating also contains an amount sufficient to improve coating properties and up to about 35% by weight based on the total solids of a sticking agent or film-forming binder.

16. A process according to claim 13, wherein the abrasion-resistant coating also contains a small quantity of a silane and up to about 35% based on the total weight of solids of a sticking agent or film-forming binder.

17. A process according to claim 16, wherein said sticking agent or film-forming binder is a thermoplastic or a thermosetting material.

18. A process according to claim 9, wherein said surface of said substrate is paper, wood, metal or thermoset resin.

19. A product obtained by the process of claim 8, with the proviso that said product is not a decorative laminate.

20. A product obtained by the process of claim 18.

21. A product obtained by the process of claim 13.

22. A product obtained by the process of claim 14.

23. A transfer film for carrying out the process of claim 2, wherein said transfer carrier is an impermeable, flexible web, and consisting essentially of, in addition to said web, said ultra-thin coating applied directly on a surface of said web.

24. A transfer film according to claim 23 wherein said binder material of said ultra-thin deposit consists essentially of microcrystalline cellulose or a mixture of microcrystalline cellulose with a small quantity of carboxy methyl cellulose; and said ultra-thin deposit also contains a small quantity of a silane and up to 35% by weight, based on the total weight of solids, of a sticking agent or film-forming binder.

25. A heat transfer for carrying out the process of claim 9 wherein said transfer carrier is an impermeable, flexible web, said dried ultra-thin coating being over said web and a plastic layer being over said ultra-thin coating, said plastic layer serving as a flowable coating.

26. A heat transfer according to claim 25 wherein said binder material of said ultra-thin deposit consists essentially of microcrystalline cellulose or a mixture of microcrystalline cellulose with a small quantity of carboxy methyl cellulose.

27. A heat transfer according to claim 26 wherein the ultra-thin deposit also contains a small quantity of a silane.

28. A heat transfer according to claim 26 wherein the ultra-thin deposit also contains up to 35% by weight, based on the total weight of solids, of a sticking agent or film-forming binder.

29. A heat transfer according to claim 27 wherein the ultra-thin deposit also contains up to 35% by weight, based on the total weight of solids, of a sticking agent or film-forming binder.

* * * * *